US006216095B1

(12) United States Patent
Glista

(10) Patent No.: US 6,216,095 B1
(45) Date of Patent: Apr. 10, 2001

(54) AUTOMATED IN SITU TESTING OF RAILROAD TELEMETRY RADIOS

(75) Inventor: Hans Glista, Gaithersburg, MD (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/177,383

(22) Filed: Oct. 23, 1998

(51) Int. Cl.[7] ............................... B61L 3/00; H04B 17/00
(52) U.S. Cl. ..................... 702/117; 375/224; 246/187 A
(58) Field of Search .................. 246/187 A; 303/47; 340/825.69; 570/249, 252, 529; 375/225, 224; 702/117

(56) References Cited

U.S. PATENT DOCUMENTS

| | | | |
|---|---|---|---|
| 4,100,531 | * 7/1978 | Kobayask | 340/146.1 E |
| 5,685,707 | * 11/1997 | Horst et al. | 246/187 A |
| 5,757,291 | * 5/1998 | Kull | 340/908 |
| 6,137,830 | * 10/2000 | Schnelder | 375/224 |

* cited by examiner

Primary Examiner—Kamini Shah

(74) Attorney, Agent, or Firm—McGuireWoods LLP

(57) ABSTRACT

Railroad telemetry radios are tested by an automated method for in situ testing, so that only those units requiring adjustment and maintenance are removed. A multi-function test set is programmed to automate testing of the radios used in a telemetry system in conjunction with other test software embedded in the host telemetry devices. The radios contain both a transmitter and a receiver. Both are individually tested to verify proper performance. Receiver sensitivity testing of the radio is tested by bit error rate (BER) measurement with test software and a dedicated BER modulator. A known low amplitude message comprised of a short pseudorandom pattern continuously repeated by the test set BER modulator is demodulated by the radio receiver. The test software processes the received data and counts the number of errorless messages received over a specific period of time. The receiver sensitivity is known to be acceptable if the number of correct messages received is higher than a predetermined minimum value. The transmitter performance is tested by measuring radio frequency (RF) carrier frequency, modulation frequency, deviation and RF output power. The test set is programmed to automatically measure these parameters, determine whether they meet minimum requirements, prompt the technician as to pass/fail status, and optionally display measured test data for use in radio repair, if required, or for statistical purposes.

5 Claims, 6 Drawing Sheets

AUTOMATED IN SITU TESTING OF RAILROAD TELEMETRY RADIOS

BACKGROUND OF THE INVENTION

1. Field of the Invention

The present invention generally relates to testing of railroad telemetry radios used in intra-train communications and, more particularly, to an automated on-locomotive testing of Locomotive Control Unit (LCU) radios and End of Train (EOT) radios. The LCU and the EOT are complementary devices which communicate with each other as part of a complete information and control system required by the Federal Railroad Administration (FRA) to be used on freight trains with few exceptions.

2. Background Description

End of Train (EOT) signaling and monitoring equipment, now widely used in place of cabooses, and a Locomotive Control Unit (LCU) installed in the locomotive are used as part of an intra-train digital telemetry communications system. The EOT is typically mounted on the last car of the train and monitors brake pipe air pressure, train movement, battery condition, etc., and transmits this information as digital data over the radio frequency (RF) telemetry link to the LCU. The information monitored by the EOT and transmitted to the LCU is displayed to the crew in the locomotive. The EOT also receives RF transmissions from the LCU to control an air valve in the train's brake pipe to initiate emergency, and in some cases, service braking.

Since the proper operation of EOTs and LCUs in intra-train communications is critical, the systems are tested before each use by the railroads. Thus, after a train has been "made-up" in the rail yard and the LCU and EOT installed, a functional test is performed to verify the overall operation of both devices. This is done as part of the normal linking and arming sequence and verifies the functional operability of the system, i.e., LCU and EOT as a linked pair.

Note that this test does not check the performance limits of the LCU and EOT radios. To check radio performance, the LCU and EOT must normally be brought to a radio shop where the proper equipment is available, and requires opening the LCU and EOT enclosures to gain access to the radios. However, as described and explained herein, the subject invention permits full radio performance testing to be performed at a convenient regular interval, in situ, such as when locomotives are "shopped".

SUMMARY OF THE INVENTION

It is therefore an object of the present invention to provide an in situ test of railroad telemetry radios;

It is another object of the invention to provide an on-locomotive test capability for the LCU radio installed on the locomotive.

It is a further object of the invention to provide an in situ test capability for the EOT radio separate from a central radio shop.

According to the invention, there is provided a multi-function test set to automate testing of the LCU without the need to remove the LCU or to open its cover. The radio module inside of the LCU contains both a transmitter and a receiver. Both are individually tested to verify proper performance. Receiver sensitivity testing of the LCU radio is tested by a bit error rate (BER) measurement with LCU test software and a dedicated BER modulator modulating the test set. The BER modulator and test set generate a known low amplitude message comprised of a short, continuously repeated pseudorandom pattern which is demodulated by the radio receiver. The test software processes the received data and counts the number of errorless messages received over a specific period of time. The receiver sensitivity is known to be acceptable if the number of correct messages received is higher than a predetermined minimum value. The transmitter performance is tested by measuring radio frequency (RF) carrier frequency, modulation frequency, deviation and RF output power. The test set is programmed to automatically measure these parameters, determine whether they meet minimum requirements, and prompt the technician as to pass/fail status.

The automated test set and procedure of this invention have significant advantages. Only those LCUs requiring adjustment and maintenance are removed, resulting in less downtime for locomotives. The procedures used for testing LCU radios are easily adapted to in situ testing of EOT radios in those situations where railroads use a central radio shop for repair and calibration, and EOTs would otherwise have to be sent to this central location for radio testing.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE PREFERRED EMBODIMENTS OF THE INVENTION

As currently deployed on many railroads, there are two basic types of LCUs installed on locomotives. Both have a local microprocessor for performing the required functions of the LCU. However, one type has a built-in user interface (control switches and displays) which can be used in conjunction with the test software to directly carry out radio testing. The test methodology and test procedures for this type of LCU will be described first. The other type of LCU has no user interface since it normally interfaces to a locomotive computer through a communications port. By accessing this communications port with a personal computer (PC) (through an input/output (I/O) box), the radio testing can be controlled by software installed on the PC. The test methodology and test procedures for this second type will be described second.

Figure 1:
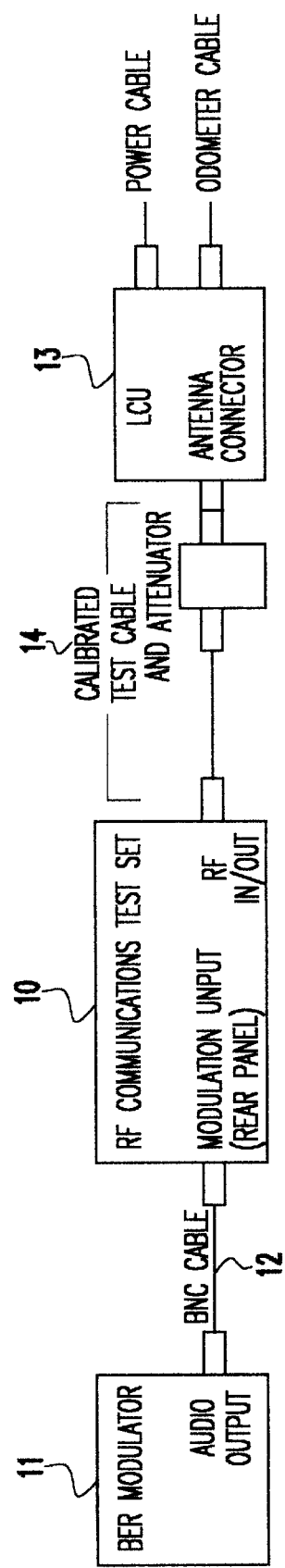
FIG. 1 is a block diagram showing the connections of a first type of LCU to the test set.

Referring now to the drawings, and more particularly to FIG. 1, there is shown a multi-function test set 10 which is programmed to automate testing. A suitable test set is the Hewlett-Packard HP8920A RF communications test set. A BER modulator 11 is connected to the modulation input of the test set by cable 12. The antenna is disconnected from the LCU 13, and a calibrated attenuator and connecting cable 14 is connected between the antenna connector of the LCU and the RF input/output of the test set.

The receiver BER test is performed first. The operator sets a predetermined identification (ID) code in the LCU using thumb wheels (not shown) and presses a key on the test set to select the test function. Then the operator enters the calibrated attenuator test cable 14 insertion loss using data keys on the test set panel. When the test set 10 displays the message "READY FOR RECEIVER BER TEST", the test is started by the operator simultaneously pressing and holding the "COMMUNICATIONS TEST/ARM" and "LOCOMOTIVE DISTANCE COUNTER" buttons on the LCU panel. During the test, a known low amplitude message comprised of a short pseudorandom pattern generated by the BER modulator 11 and transmitted via the test set 10, the calibrated attenuator and connecting cable 14 to the LCU 13 is demodulated by the radio receiver. Special software in the LCU 13 processes the received data and counts the number of errorless messages received over a specific time period. The receiver sensitivity is known to be acceptable if the number of correct messages received is higher than a predetermined minimum value. At the end of the BER test, the LCU 13 will display either "BER PASS" or "BER FAIL". If the LCU fails the BER test, the LCU is removed from service for maintenance and repair.

To conduct the tests on the transmitter module of the LCU 13, the BER modulator 11 is first turned off. The "COMMUNICATIONS TEST/ARM" button on the LCU panel is pressed to begin a transmission from the LCU transmitter module to the test set 10. This transmission from the LCU 13 is at a first predetermined power level and at a predetermined frequency. To measure this signal, a designated key on the test set 10 is pressed. The test set 10 then measures the RF power, transmit frequency, deviation and modulation frequency of the signal, these measurements being compensated for the attenuator and connecting cable 14 insertion loss. The measured parameter values are stored, and the measured parameter values are then compared to previously set parameter limits. The test set 10 then displays either "TRANSMITTER TEST PASSED" or "TRANSMITTER TEST FAILED". If the test failed as a result of any of the measured parameter values not being within the limits, the LCU is removed from service.

Note that after a radio is tested, whether it fails or passes, a display and, optionally if the test set is so equipped, a printout of the test results can be obtained by pressing a key on the test set. Thus, if the radio failed, these test results can help the radio shop to identify the failure area and speed the repair process. Further, even if the radio passed, access to the test results data will also be useful for collecting radio performance statistics.

However, if the test passed, the user will see the "RADIOTST" message displayed in the display window of the LCU as a prompt. The user then presses the "COMMUNICATIONS TEST/ARM" button again to begin a second transmission from the LCU 13 to the test set 10, this time at a lower predetermined power level and a predetermined frequency. After the designated key on the test set 10 is again pressed, the test set again measures the RF power, transmit frequency, deviation and modulation frequency of the signal, these measurements being compensated for the attenuator and calibrated test cable 14 insertion loss. The measured parameter values are stored, and the measured parameter values are then compared to previously set parameter limits. The test set 10 will display "ALL TESTS PASSED" or "TEST FAILED". Again, a display of the test results data can be obtained from the test set to either aid in repair of the LCU or for data collection and analysis.

Figure 2:
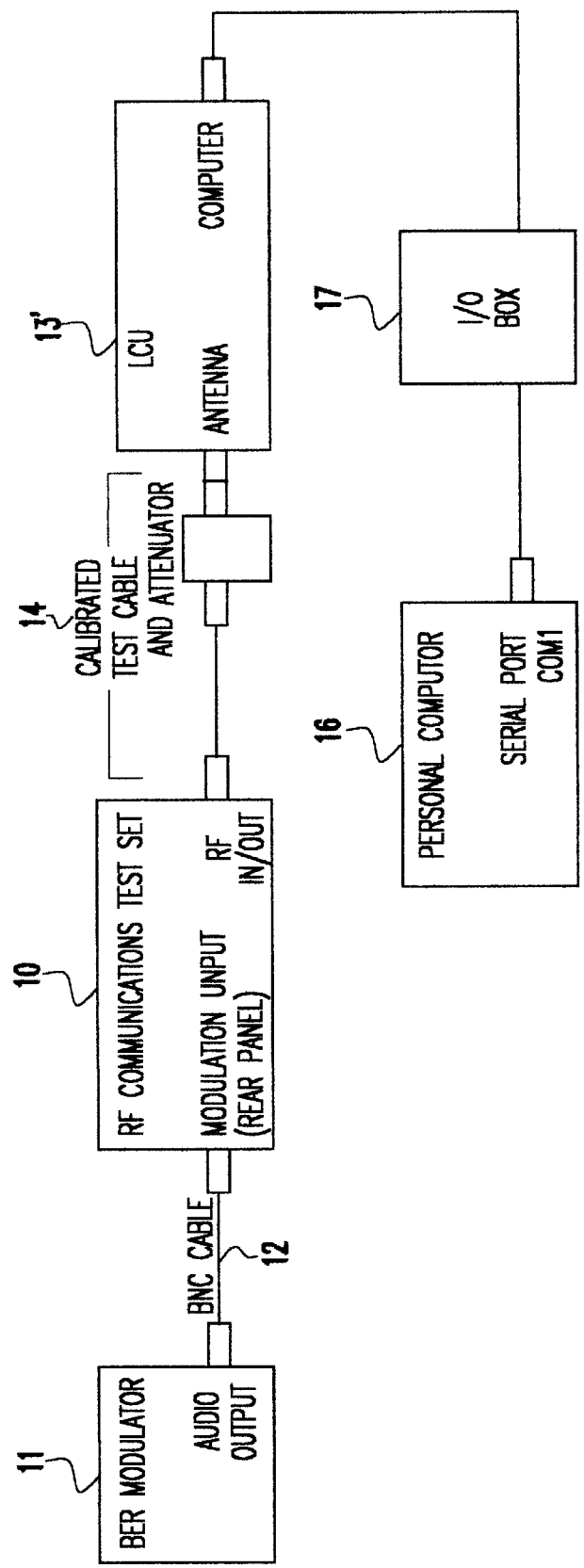
FIG. 2 is a block diagram showing the connections of a second type of LCU to the test set.

With reference now to FIG. 2, in the case of the second type of LCU 13', the multi-function test set 10, BER modulator 11, attenuator and calibrated test cable 14 are connected as before. In this case, a lap top personal computer (PC) 16 is connected to the computer input of the LCU via an input/output (I/O) box 17. The PC 16 may have the test programs stored on its hard disk or, alternatively, a floppy disk may be provided which contains the test programs.

The receiver BER test is performed first as before, but the test is initiated by user input through the PC 16. For example, for a PC running under the Windows 95 operating system (OS), the operator uses the cursor control device (e.g., mouse, touch pad, track ball, etc.) to select and execute the test program. Then, in response to the program prompts, the operator then enters the calibrated attenuator and connecting cable 14 insertion loss using data keys on the test set 10. When the test set displays the message "READY FOR RECEIVER BER TEST", the operator presses a designated key on the PC keyboard to begin the receiver BER test. During the test, a known low amplitude message comprised of a short pseudorandom pattern generated by the BER modulator and transmitted via the test set 10, the calibrated attenuator and connecting cable 14 to the LCU 13' is demodulated by the radio receiver. The software in the PC 16 processes the received data and counts the number of errorless messages received over a specific time period. The receiver sensitivity is known to be acceptable if the number of correct messages received is higher than a predetermined minimum value. At the end of the BER test, the PC 16 will display either "BER PASS" or "BER FAIL". If the LCU fails the BER test, the LCU is removed from service for maintenance and repair.

To conduct the tests on the transmitter module of the LCU, the BER modulator 11 is first turned off. The PC monitor displays "READY TO TRANSMIT" as a prompt to the operator, and in response to this prompt, the operator presses the designated key on the PC keyboard and the designated key on the test set. The transmission from the LCU 13' is at a first predetermined power level and at a predetermined frequency. The test set measures the RF power, transmit frequency, deviation and modulation frequency of the signal, these measurements being compensated for the attenuator cable insertion loss. The measured parameter values are stored, and the measured parameter values are compared to previously set parameter limits. The test set 10 then displays either "TRANSMITTER TEST PASSED" or "TRANSMITTER TEST FAILED". If the test failed as a result of any of the measured parameter values not being within the limits, the LCU is removed from service. However, if the test passed, the user waits for the "READY TO TRANSMIT" prompt message to be displayed on the PC screen and then again presses the designed key on the PC keyboard and the designated key of the test set to begin a second transmission from the LCU 13 to the test set 10, this time at a lower predetermined power level and a predetermined frequency. The test set 10 again measures the RF power, transmit frequency, deviation and modulation frequency of the signal, these measurements being compensated for the attenuator cable insertion loss. The measured parameter values are stored, and the measured parameter values are compared to previously set parameter limits. The test set 10 will display "ALL TESTS PASSED" or "TEST FAILED". If the test failed, the LCU is taken out of service for maintenance or repair. Again, test results data can be obtained from the test set, as described previously.

FIGS. 3A and 3B and FIGS. 4A and 4B are, respectively, flow diagrams illustrating the logic of the separate test programs for the RF test set and the LCU. These diagrams include a sequential list of required operator actions listed with arrows pointing to the specific location in each flow diagram to which the action is related. Note that the LCU radio test software routines may either be embedded in an LCU of the first type, as specifically shown in FIGS. 4A and 4B, or these routines may be implemented on the PC which is used in the testing of an LCU of the second type.

Figure 3A:
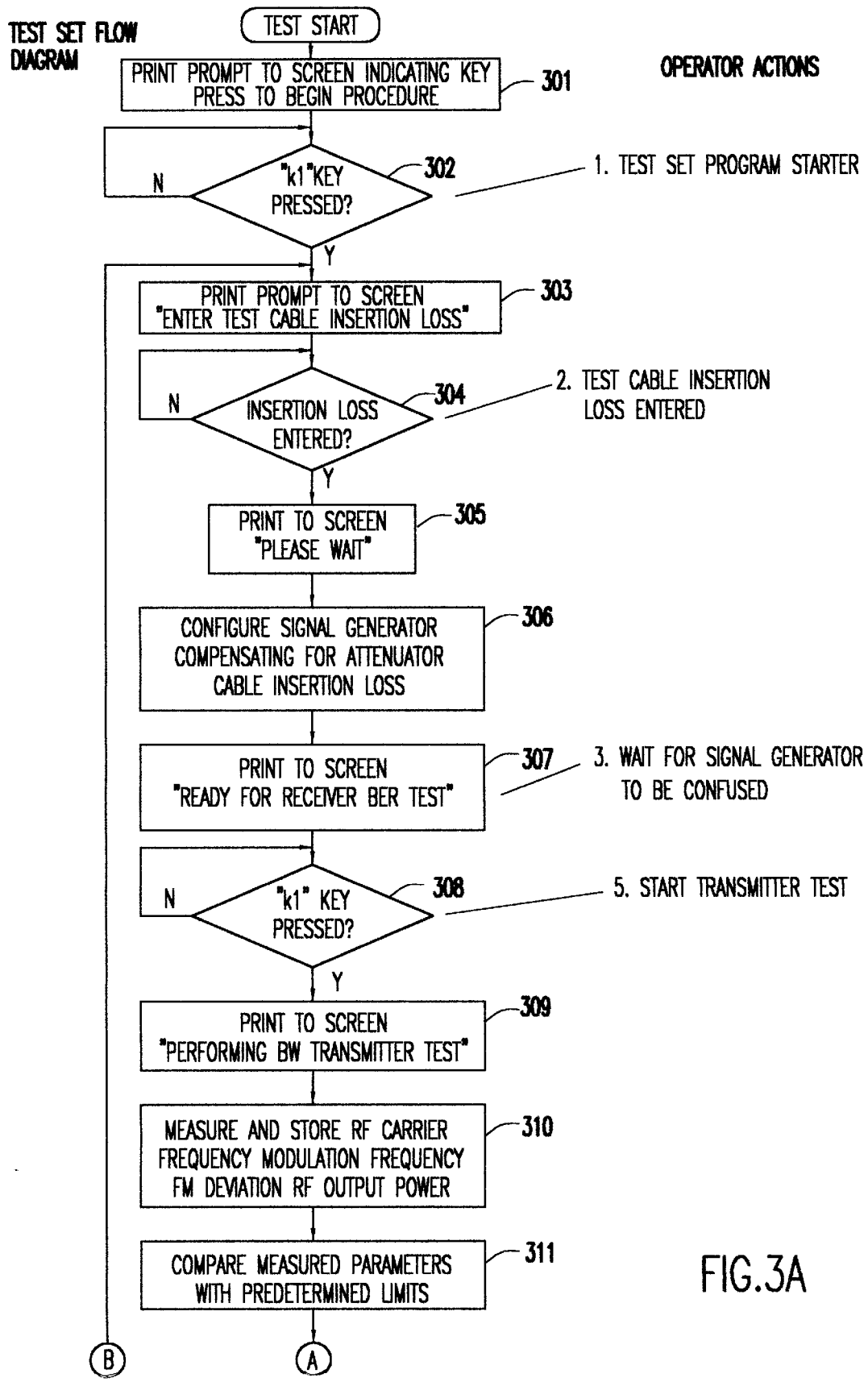
FIGS. 3A and 3B, taken together, are a flow diagram illustrating the logic of the test program for the test set and showing sequential actions required of the operator as he interacts with the controls of the test set.

In either case and with reference to FIG. 3A, with the LCU powered on, the radio test process begins in function block 301 on power-up of the test set with a prompt message displayed on the screen of the test set to press a designated key (k1) to start actual testing. In decision block 302, the test for the k1 key press is made which, when affirmative, leads to function block 303 prompting the operator to enter the test cable insertion loss. Then, decision block 304 tests for entry of the cable loss which, when affirmative, prints a "PLEASE WAIT" message to the screen in function block 305, while the test set in function block 306 configures itself to compensate for the entered insertion loss. When configured, the test set displays the "READY FOR RECEIVER BER TEST" in function block 307, and then waits in decision block 308 for the k1 key press. When k1 is pressed, the affirmative exit leads to the display of the next prompt in function block 309 "PERFORMING 8W TRANSMITTER TEST" during which the test set makes the measurements identified in function block 310 and stores the measured data in memory. In function block 311, the measured parameters are then compared to predetermined limits.

Figure 3B:
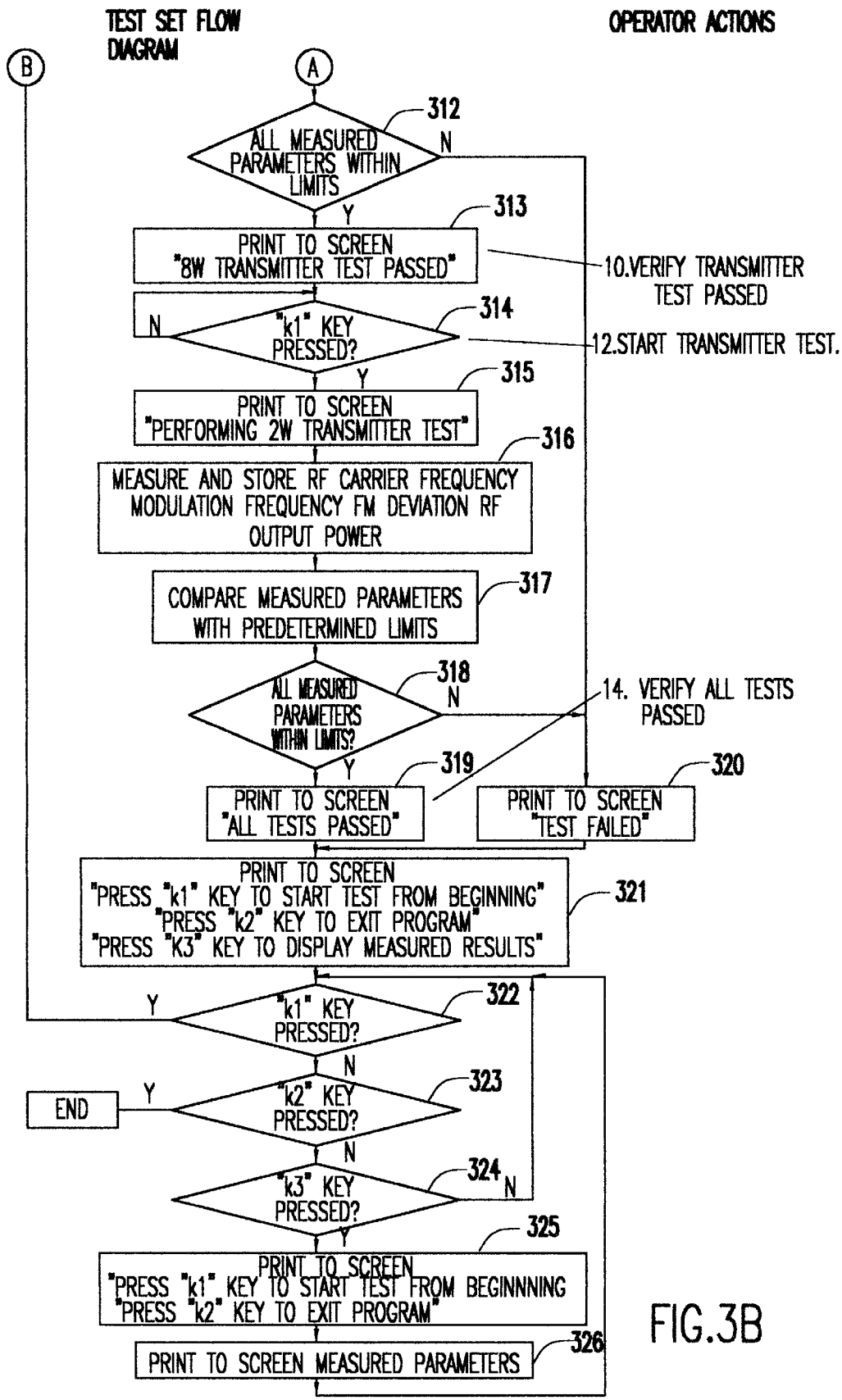

Referring now to FIG. 3B, if all parameters are within their limits, as checked in decision block 312, the affirmative exit leads to function block 313, which displays the screen message "8W TRANSMITTER TEST PASSED". However, if any parameters are beyond their limits, the negative exit from decision block 312 leads to function block 320, which displays the message "TEST FAILED", and then to function block 321 which displays exit menu choices described below. The program flow then proceeds to decision block 314, which requests a k1 key press which, when affirmative, prints a screen message "PERFORMING 2W TRANSMITTER TEST" in function block 315, during which the test set makes the measurements identified in function block 316 and stores the measured data in memory. In function block 317, the measured parameters are then compared to predetermined limits. if all parameters are within their limits, as checked in decision block 318, the affirmative exit leads to function block 319, which displays the screen message "ALL TESTS PASSED". However, if any parameters are beyond their limits, the negative exit from decision block 318 leads to function block 320, which displays the screen massage "TEST FAILED". The program flow then proceeds to function block 321, which displays an exit selection menu prompting the operator for one of three key presses k1, k2 or k3. The three possible key presses are examined sequentially in decision blocks 322, 323 and 324. A k1 key press provides the affirmative answer leading to restarting the entire test; a k2 key press exists the program; or a k3 key press branches affirmatively to function block 325, which displays a prompt message again allowing a k1 or k2 key press to restart the test and also displays the measured parameters on the screen in function block 326.

Figure 4A:
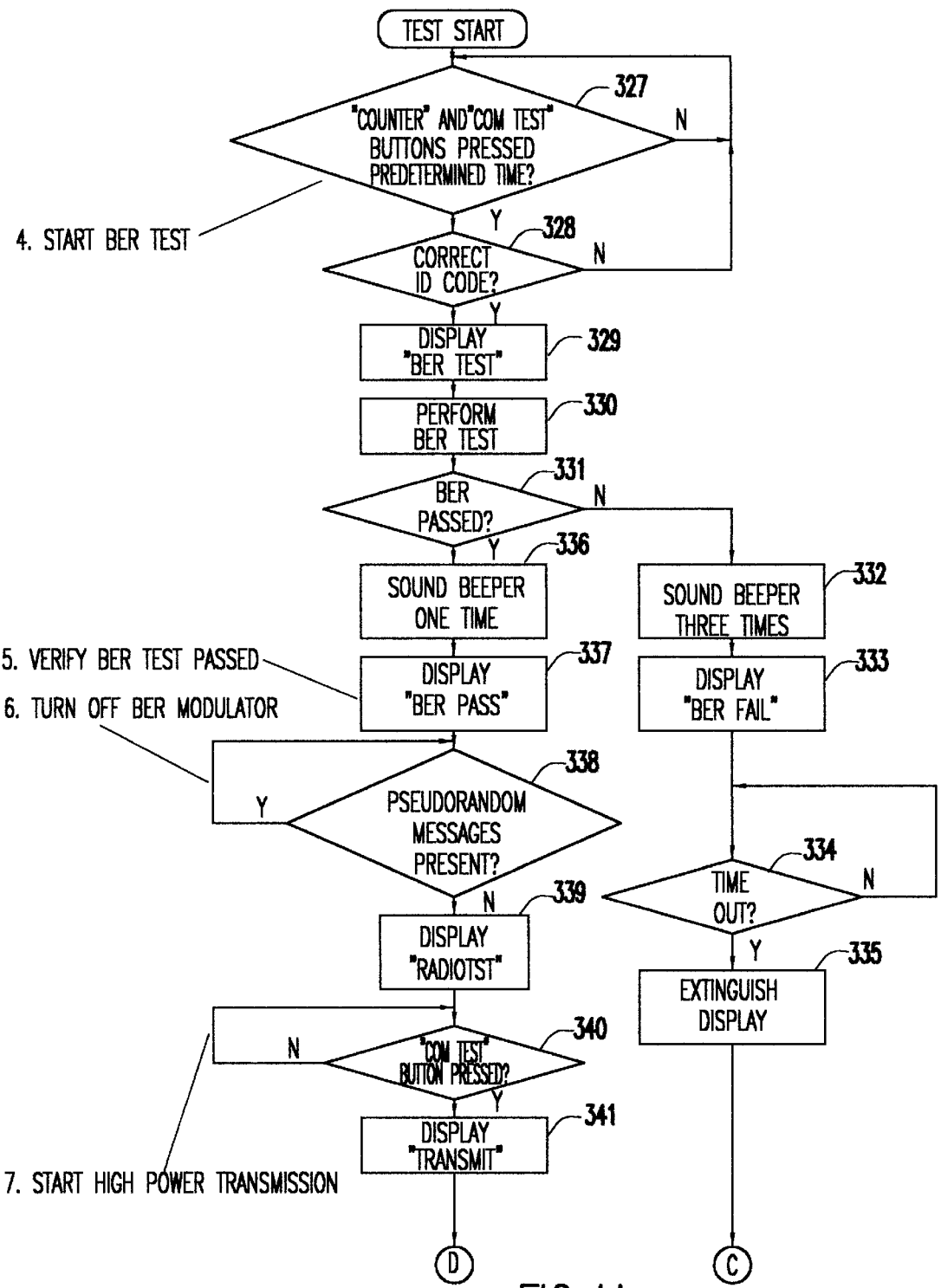
FIGS. 4A and 4B, taken together are a flow diagram illustrating the logic of the test program for the LCU and showing sequential actions required of the operator as he interacts with the controls of the LCU.

Continuing with reference now to FIG. 4A, the software flow for the radio test process resident within the LCU will now be described. The process starts from the normal mode of LCU operation with a test in decision block 327 to determine if the "COUNTER" or "COM TEST" buttons have been pressed and held for a predetermined time interval. If not, the LCU remains in normal operating mode. However, if the test in decision block 327 is affirmative, the program flow proceeds to decision block 328, which tests that the correct identification (ID) code has been entered into the LCU ID code switches. If yes, the message "BER TEST" is displayed in function block 329 and the BER test is started in function block 330. The results of the BER test are examined in decision block 331 with a fail result sounding the beeper three times in function block 332 and displaying the screen message "BER FAIL" in function block 333. The time out decision block 334 holds the display illuminated until a predetermined time out period elapses, at which time the display is extinguished in function block 335 and the LCU test program ends. If, however, the BER test passes, then decision block 331 is exited affirmatively which sounds the beeper one time in function block 336 and displays the screen message "BER PASS" in function block 337. At this point, the operator turns off the BER modulator resulting in the pseudorandom RF signal at the LCU radio input being removed. Thus, decision block 338 is no longer satisfied, and program flow proceeds to function block 339, which displays "RADIOTST", and then waits for a "COM TEST" button press in decision block 340. When the "COM TEST" button is pressed, decision block 340 is exited affirmatively resulting in the display of the "TRANSMIT" screen message in function block 341.

Figure 4B:
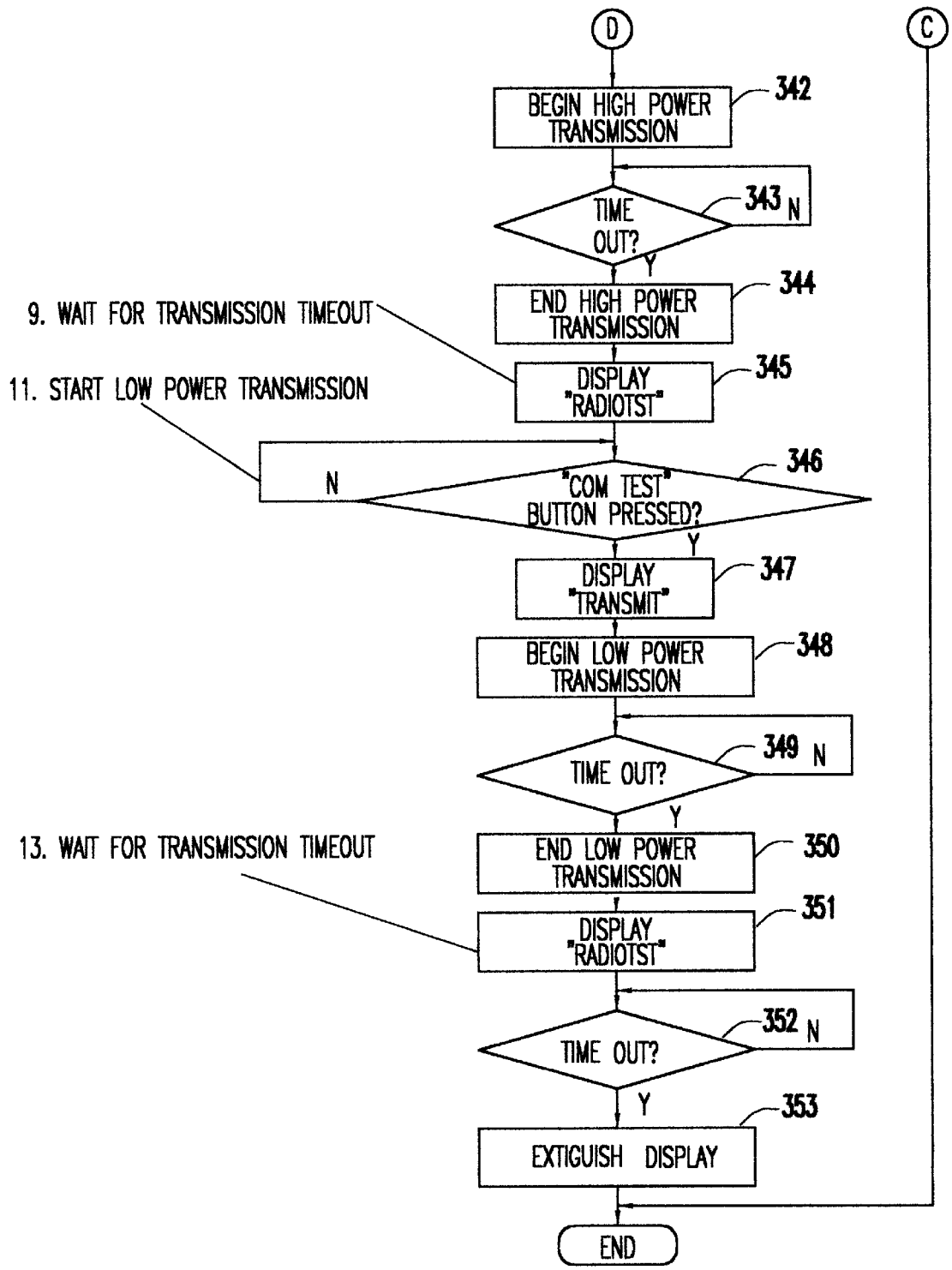

Referring now to FIG. 4B, a high power RF transmission is generated from the LCU radio in function block 342. This RF transmission continues until the timeout period set by decision block 343 is satisfied, resulting in the affirmative exit to function block 344 which terminates the high power RF transmission, and displays the "RADIOTST" screen message in function block 345. Next, the software flow idles at decision block 346 waiting for the operator to press the "COM TEST" button again. When this button is pressed, the affirmative exit results in the display of the "TRANSMIT" scree message in function block 347, and the generation of the low power RF transmission from the LCU radio in function block 348. This RF transmission continues until the time out period set by decision block 349 is satisfied, resulting in the affirmative exit to function block 350, which terminates the low power RF transmission and displays the "RADIOTST" screen message in block 351. The "RADIOTST" screen message remains displayed for the duration of a time out period set by decision bloc 352. When this time elapses, the affirmative exit from decision block 352 leads to function block 353 which extinguishes the display, and the program ends.

While the invention has been described in terms of preferred embodiments as particularly applied to LCU radios, those skilled in the art will recognize that the invention can be practiced with modification within the spirit and scope of the appended claims. The invention is not necessarily limited to testing LCU radios and, as has been noted herein, may be used to some advantage in field testing EOT radios where the convenience of a local in situ test is logistically advantageous.

Having thus described my invention, what I claim as new and desire to secure by Letters Patent is as follows:

1. A method of testing railroad telemetry radios comprising the steps of:

testing radio receiver sensitivity by bit error rate (BER) measurement using a BER modulator;

returning a pass or fail message depending on a predetermined criteria of BER detection;

testing transmitter performance by measuring parameters of radio frequency (RF) carrier frequency, modulation frequency, deviation and RF output power;

storing the measured parameters;

comparing the measured parameters with predetermined parameter limits; and returning a pass or fail message depending on the results of the comparing step.

2. The method of testing railroad telemetry radios recited in claim 1 further comprising the step of generating measured data to either aid in radio repair or for data collection and analysis.

3. The method of testing of railroad telemetry radios recited in claim 1 wherein the step of testing the receiver comprises the steps of:

transmitting to the receiver a known low amplitude message comprised of a short pseudorandom pattern continuously repeated which is demodulated by the radio receiver; and counting a number of errorless messages received over a specific period of time, the receiver sensitivity passing the test if the number of correct messages received is higher than a predetermined minimum value.

4. The method of testing railroad telemetry radios as recited in claim 3 wherein the radio tested is part of a Locomotive Control Unit installed in a railroad locomotive and the test is performed on the locomotive.

5. The method of testing railroad telemetry radios as recited in claim 3 wherein the radio tested is part of an End of Train (EOT) unit and the test is performed in the field without sending the EOT unit to another location.

* * * * *